United States Patent
Ikeda et al.

(10) Patent No.: US 11,244,443 B2
(45) Date of Patent: Feb. 8, 2022

(54) EXAMINATION APPARATUS, EXAMINATION METHOD, RECORDING MEDIUM STORING AN EXAMINATION PROGRAM, LEARNING APPARATUS, LEARNING METHOD, AND RECORDING MEDIUM STORING A LEARNING PROGRAM

(71) Applicant: ADVANTEST CORPORATION, Tokyo (JP)

(72) Inventors: Kosuke Ikeda, Tokyo (JP); Ira Leventhal, San Jose, CA (US); Keith Schaub, The Hills, TX (US)

(73) Assignee: ADVANTEST CORPORATION, Tokyo (JP)

( * ) Notice: Subject to any disclaimer, the term of this patent is extended or adjusted under 35 U.S.C. 154(b) by 144 days.

(21) Appl. No.: 16/524,162

(22) Filed: Jul. 28, 2019

(65) Prior Publication Data
US 2021/0027443 A1 Jan. 28, 2021

(51) Int. Cl.
*G06T 7/00* (2017.01)
*G06K 9/62* (2006.01)

(52) U.S. Cl.
CPC ............ *G06T 7/001* (2013.01); *G06K 9/6256* (2013.01); *G06K 9/6262* (2013.01); *G06T 2207/20081* (2013.01); *G06T 2207/30148* (2013.01)

(58) Field of Classification Search
CPC ............... G06K 9/6256; G06K 9/6262; G06T 2207/20081; G06T 2207/30148; G06T 7/001
See application file for complete search history.

(56) References Cited

U.S. PATENT DOCUMENTS

| 10,867,327 B1* | 12/2020 | Wilbert | H04W 4/40 |
| 2018/0285698 A1* | 10/2018 | Yamada | G06K 9/6267 |
| 2019/0336033 A1 | 11/2019 | Hidenori | |
| 2019/0392201 A1* | 12/2019 | Ostrovsky | G06K 9/6218 |
| 2020/0020089 A1* | 1/2020 | Cheng | G06K 9/00241 |
| 2020/0096862 A1* | 3/2020 | Tolani | G01N 21/33 |
| 2020/0111204 A1* | 4/2020 | Cosatto | G06K 9/6267 |

(Continued)

FOREIGN PATENT DOCUMENTS

| JP | 2000341705 A | 12/2000 |
| JP | 2017054239 A | 3/2017 |

(Continued)

OTHER PUBLICATIONS

International Search Report for International Patent Application No. PCT/JP2020/018851, issued by the Japan Patent Office dated Jul. 28, 2020.

*Primary Examiner* — Bobbak Safaipour (57) ABSTRACT

Provided is an examination apparatus including a target image acquiring section that acquires a target image obtained by capturing an examination target; a target image masking section that masks a portion of the target image; a masked region predicting section that predicts an image of a masked region that is masked in the target image; a reproduced image generating section that generates a reproduced image using a plurality of predicted images predicted respectively for the plurality of masked regions; and a difference detecting section that detects a difference between the target image and the reproduced image.

15 Claims, 8 Drawing Sheets

(56) References Cited

U.S. PATENT DOCUMENTS

| | | | | |
|---|---|---|---|---|
| 2020/0134313 A1* | 4/2020 | Endoh | ............... | G06N 3/084 |
| 2020/0175669 A1* | 6/2020 | Bian | ............... | G06T 7/0004 |
| 2020/0349763 A1* | 11/2020 | Chen | ............... | G06T 17/205 |
| 2020/0364501 A1* | 11/2020 | Herz | ............ | G07G 1/12 |

FOREIGN PATENT DOCUMENTS

| | | |
|---|---|---|
| JP | 2018173814 A | 11/2018 |
| JP | 2019093126 A | 6/2019 |

\* cited by examiner

EXAMINATION APPARATUS, EXAMINATION METHOD, RECORDING MEDIUM STORING AN EXAMINATION PROGRAM, LEARNING APPARATUS, LEARNING METHOD, AND RECORDING MEDIUM STORING A LEARNING PROGRAM

BACKGROUND

1. Technical Field

The present invention relates to an examination apparatus, an examination method, a recording medium storing thereon an examination program, a learning apparatus, a learning method, and a recording medium storing thereon a learning program.

2. Related Art

Conventionally, an appearance examination of an examination target is performed to judge acceptability of this examination target. For example, in an appearance examination of a probe pin for testing a semiconductor, an image of the probe pin is captured and digitized, and the digitized data is evaluated using predetermined rules to judge acceptability of the probe pin.

However, when examining the examination target, there is a desire to make it easy to understand the state of the examination target.

SUMMARY

In order to solve the problem above, according to a first aspect of the present invention, provided is an examination apparatus. The examination apparatus may comprise a target image acquiring section that acquires a target image obtained by capturing an examination target. The examination apparatus may comprise a target image masking section that masks a portion of the target image. The examination apparatus may comprise a masked region predicting section that predicts an image of a masked region that is masked in the target image. The examination apparatus may comprise a reproduced image generating section that generates a reproduced image using a plurality of predicted images predicted respectively for a plurality of masked regions including the masked region. The examination apparatus may comprise a difference detecting section that detects a difference between the target image and the reproduced image.

The difference detecting section may compare the target image to the reproduced image in every predetermined region, to calculate a degree of the difference in every predetermined region.

The examination apparatus may further comprise a judging section that judges the examination target to be unacceptable if the degree of difference does not satisfy a predetermined quality standard.

The judging section may judge the examination target to be unacceptable if a largest degree of difference, among the degrees of difference of every predetermined region, exceeds a predetermined threshold value.

If the judging section judges the examination target to be unacceptable, the judging section may predict an electrical characteristic of the examination target from the target image obtained by capturing the examination target that was judged to be unacceptable, and confirms that the examination target is unacceptable if the electrical characteristic does not satisfy a predetermined quality standard.

If the judging section judges the examination target to be unacceptable, the judging section may predict an electrical characteristic of the examination target from the target image obtained by capturing the examination target that was judged to be unacceptable, and determines that the examination target is acceptable if the electrical characteristic satisfies a predetermined quality standard.

The difference detecting section may output a detection map in which a display attribute differs in every predetermined region, according to the degree of difference.

The difference detecting section may calculate the degree of difference based on a Euclidian distance between the target image and the reproduced image.

The target image masking section may sequentially mask one cell at a time among a plurality of cells obtained by dividing the target image, and the reproduced image generating section may generate the reproduced image using a plurality of predicted images predicted respectively for different cells.

The target image acquiring section may acquire an image obtained by performing a grayscale conversion on the captured image of the examination target, as the target image.

The target image acquiring section may acquire an image obtained by performing object detection on the examination target in the captured image of the examination target to narrow a target region, as the target image.

According to a second aspect of the present invention, provided is an examination method. The examination method may comprise acquiring a target image obtained by capturing an examination target; masking a portion of the target image; predicting an image of a masked region that is masked in the target image; generating a reproduced image using a plurality of predicted images predicted respectively for a plurality of masked regions including the masked region; and detecting a difference between the target image and the reproduced image.

According to a third aspect of the present invention, provided is a recording medium storing thereon an examination program. The program, when executed by a computer, causes the computer to function as a target image acquiring section that acquires a target image obtained by capturing an examination target; a target image masking section that masks a portion of the target image; a masked region predicting section that predicts an image of a masked region that is masked in the target image; a reproduced image generating section that generates a reproduced image using a plurality of predicted images predicted respectively for a plurality of masked regions including the masked region; and a difference detecting section that detects a difference between the target image and the reproduced image.

According to a fourth aspect of the present invention, provided is a learning apparatus. The learning apparatus may comprise a training image acquiring section that acquires a training image; a training image masking section that masks a portion of the training image; a predictive model that receives the masked training image and output a model image obtained by predicting the training image; and a model updating section that updates the predictive model based on an error between the training image and the model image.

According to a fifth aspect of the present invention, provided is a learning method. The learning method may comprise acquiring a training image; masking a portion of the training image; inputting the masked training image to a predictive model and outputting a model image obtained by predicting the training image; and updating the predictive model based on an error between the training image and the model image.

According to a sixth aspect of the present invention, provided is a recording medium storing thereon a learning program. The learning program, when executed by a computer, causes the computer to function as a training image acquiring section that acquires a training image; a training image masking section that masks a portion of the training image; a predictive model that receives the masked training image and output a model image obtained by predicting the training image; and a model updating section that updates the predictive model based on an error between the training image and the model image.

The summary clause does not necessarily describe all necessary features of the embodiments of the present invention. The present invention may also be a sub-combination of the features described above.

DESCRIPTION OF EXEMPLARY EMBODIMENTS

Hereinafter, some embodiments of the present invention will be described. The embodiments do not limit the invention according to the claims, and all the combinations of the features described in the embodiments are not necessarily essential to means provided by aspects of the invention.

Figure 1:
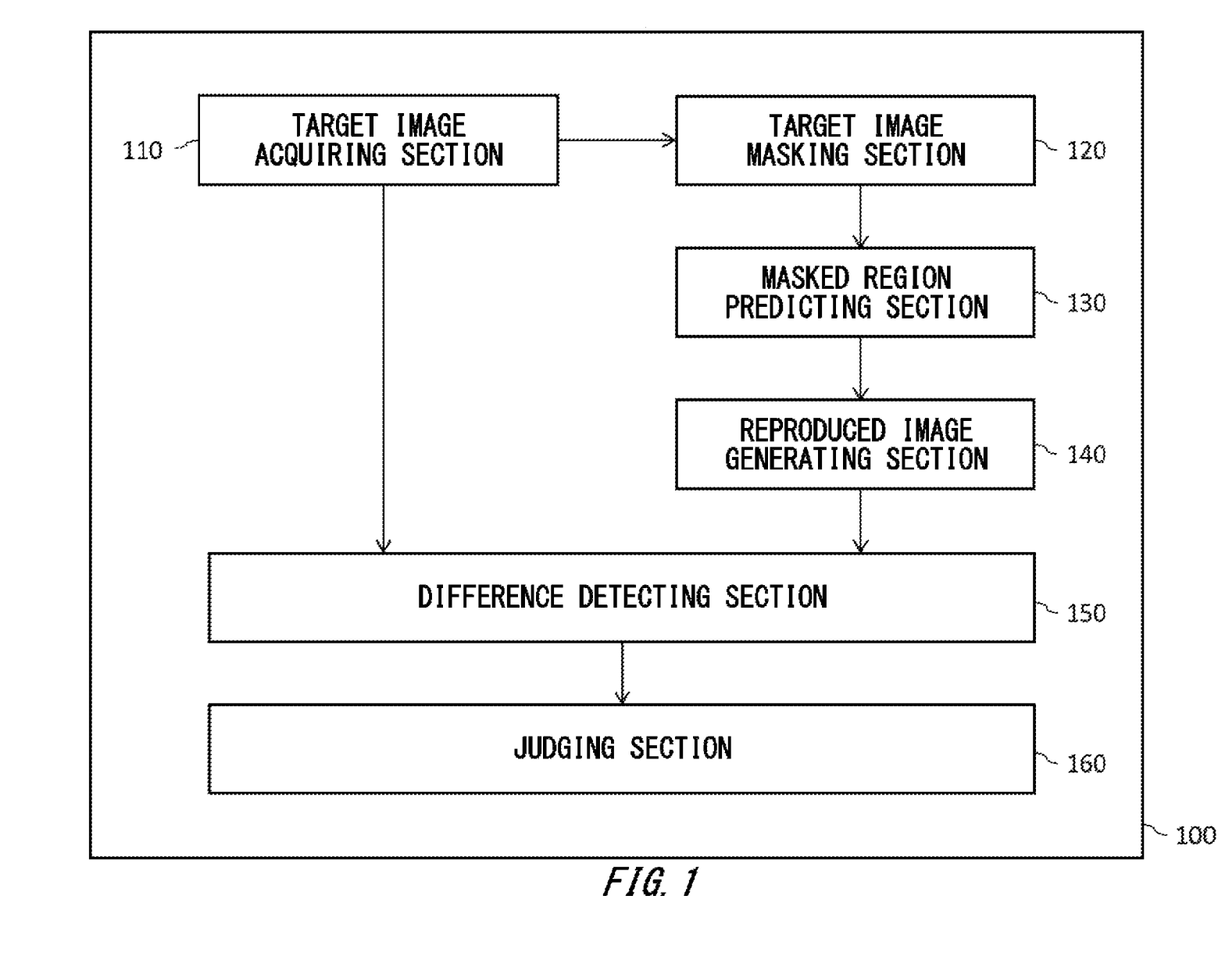
FIG. 1 shows a block diagram of the examination apparatus 100 according to the present embodiment.

FIG. 1 shows a block diagram of an examination apparatus 100 according to the present embodiment. The examination apparatus 100 can make it easy to understand the state of an examination target, by detecting the difference between an image obtained by capturing the actual state of the examination target and an image generated by predicting the state that the examination target should be in. In the present embodiment, an example is described in which the examination apparatus 100 uses a probe pin for testing a semiconductor as the examination target. However, the examination target is not limited to this. The examination apparatus 100 may be used to analyze an image of bumps of a semiconductor device, examine a pattern of a wiring substrate, or examine other electronic components, or may be used to examine any kind of object that is not an electrical component.

The examination apparatus 100 may be a computer such as a PC (personal computer), tablet computer, smartphone, work station, server computer, or general user computer, or may be a computer system in which a plurality of computers are connected. Such a computer system is also a computer, in a broad sense. The examination apparatus 100 may be implemented in a virtual computer environment that can be executed in one or more computers. Instead, the examination apparatus 100 may be a specialized computer designed for the purpose of examining the examination target, or may be specialized hardware realized by specialized circuitry. If the examination apparatus 100 is capable of connecting to the Internet, the examination apparatus 100 may be realized by cloud computing.

The examination apparatus 100 includes a target image acquiring section 110, a target image masking section 120, a masked region predicting section 130, a reproduced image generating section 140, a difference detecting section 150, and a judging section 160.

The target image acquiring section 110 acquires a target image obtained by capturing an image of the examination target. The target image acquiring section 110 may acquire an image obtained by pre-processing a captured image of the examination target, as the target image. In this case, the target image acquiring section 110 may acquire the target image via a network, acquire the target image via user input, or acquire the target image via a memory device or the like capable of storing data, for example. The target image acquiring section 110 supplies the acquired target image to the target image masking section 120 and the difference detecting section 150.

The target image masking section 120 masks a portion of the target image. The target image masking section 120 then supplies the masked region predicting section 130 with a plurality of masked images obtained by masking respectively different portions of the target image.

The masked region predicting section 130 predicts an image of the masked region that is masked in the target image. The masked region predicting section 130 then supplies the reproduced image generating section 140 with a plurality of predicted images predicted for each masked region in the plurality of masked images.

The reproduced image generating section 140 generates a reproduced image using the plurality of predicted images predicted respectively for the plurality of masked regions. The reproduced image generating section 140 supplies the difference detecting section 150 with the generated reproduced image.

The difference detecting section 150 detects the difference between the target image and the reproduced image. At this time, the difference detecting section 150 may compare the target image supplied from the target image acquiring section 110 to the reproduced image supplied from the reproduced image generating section 140, in each predetermined region, for example, to calculate a degree of difference in each predetermined region. The difference detecting section 150 then supplies the calculated degree of difference to the judging section 160.

The judging section 160 judges that the examination target is unacceptable if the degree of difference does not satisfy a predetermined quality standard. The judging section 160 outputs the judgment result to another function section, another apparatus, and the like. The following uses a flow to describe the details of examining an examination target using such an examination apparatus 100.

Figure 2:
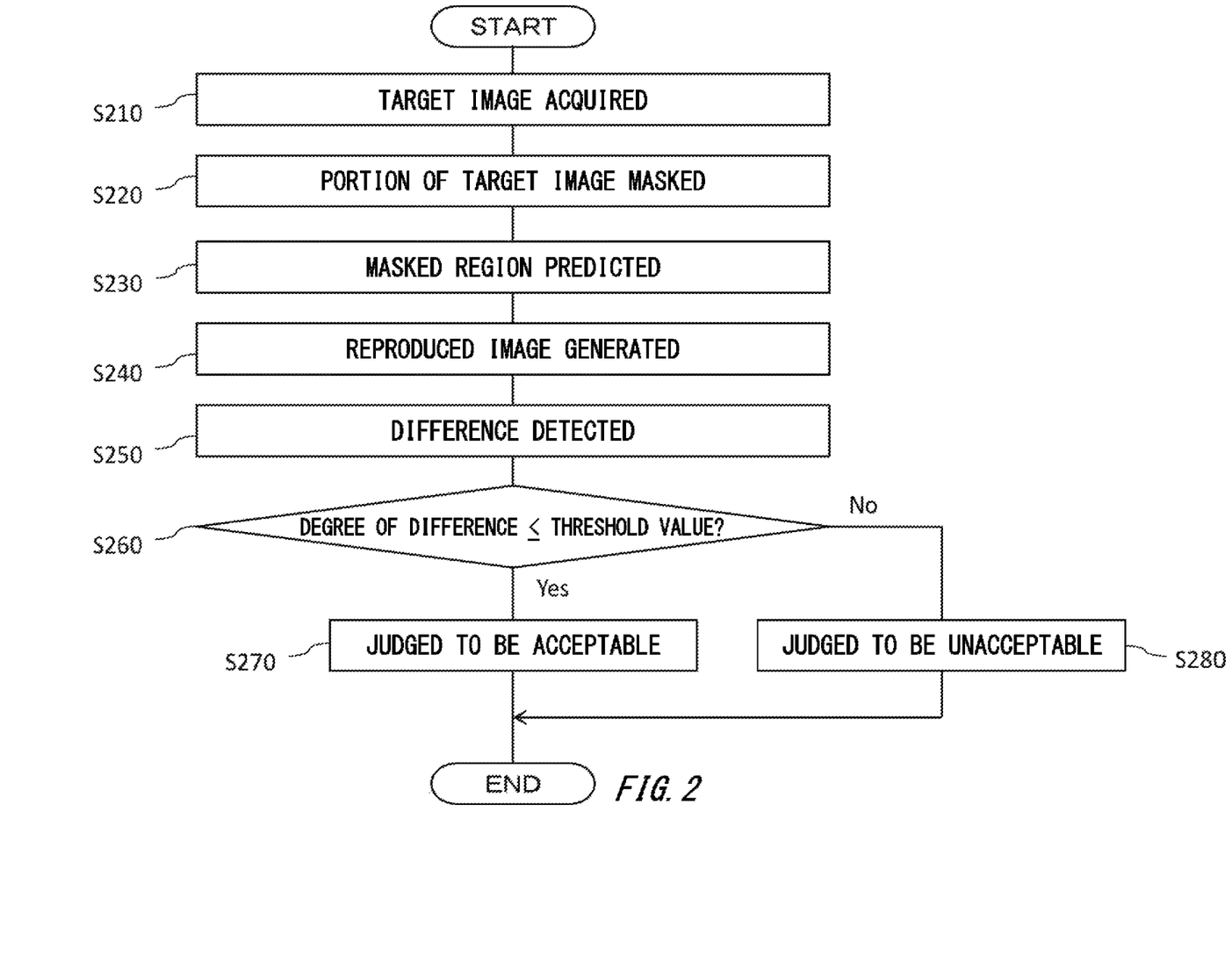
FIG. 2 shows an example of a flow for examining an examination target with the examination apparatus 100 according to the present embodiment.

FIG. 2 shows an example of a flow for examining an examination target with the examination apparatus 100 according to the present embodiment. At step 210, the target image acquiring section 110 acquires the target image obtained by capturing an image of the examination target. As an example, the target image acquiring section 110 acquires, via a network, an image of a probe pin for testing a semiconductor capture using an optical microscope or the like.

The target image acquiring section 110 converts the captured image of the examination target to grayscale. The image of the probe pin captured using the optical microscope or the like can include three channels corresponding respectively to the three colors R, G, and B. However, from the viewpoint of the examination according to the present embodiment, these three channels have approximately the same features, and no one channel has a feature that is unique compared to the other channels. Accordingly, the target image acquiring section 110 converts the acquired image to a single channel by performing the grayscale conversion on the acquired image. In this way, the target image acquiring section 110 may acquire an image obtained by performing a grayscale conversion on the captured image of the examination target, as the target image. When acquiring the target image, the examination apparatus 100 can reduce the load of the examination process by performing the grayscale conversion on the acquired image to only use a single channel. In a case where it is preferable to use a plurality of channels, e.g. a case where the accuracy of the examination is to be improved, the target image acquiring section 110 may acquire the captured image of the examination target as-is as the target image, without performing the grayscale conversion.

The target image acquiring section 110 narrows the captured image of the examination target. For example, the target image acquiring section 110 recognizes the position and size of the probe pin in the image using an object detection algorithm such as YOLO (You Only Look Once). The target image acquiring section 110 narrows the target region by clipping the image based on the position and size of the recognized probe pin. In this way, the target image acquiring section 110 may perform object detection of the examination target in the captured image of the examination target, and acquire the image in which the target region has been narrowed as the target image. In this way, when acquiring the target image, the examination apparatus 100 can improve the examination accuracy and speed up the examination process by performing object detection of the examination target and narrowing the target region. The target image acquiring section 110 acquires the pre-processed image (e.g. the image on which grayscale conversion and narrowing have been performed) as the target image, and supplies the target image masking section 120 and the difference detecting section 150 with this target image.

At step 220, the target image masking section 120 masks a portion of the target image. As an example, the target image masking section 120 divides the target image acquired at step 210 into a plurality of cells. The target image masking section 120 then sequentially masks one cell at a time among the plurality of cells obtained by dividing the target image. The target image masking section 120 supplies the masked region predicting section 130 with the plurality of masked images obtained by masking each of the plurality of cells.

At step 230, the masked region predicting section 130 predicts an image of a masked region that is masked in the target image. At this time, the masked region predicting section 130 may use a learned model, such as a CNN (Convolution Neural Network) that has learned to be capable of predicting an image of the masked region from another image that is unmasked, when the image in which a partial region is masked is input, using only training images of examination targets known to be acceptable, for example. In other words, the masked region predicting section 130 may use a learned model that has learned to be capable of predicting the state of the masked region when the examination target is acceptable, using only training images of examination targets known to be acceptable. As an example, the masked region predicting section 130 inputs each of the plurality of masked images obtained at step 220 into the learned model, and predicts the image of the masked region for each of the plurality of cells. The learning of such a model is described further below. The above description is an example in which the masked region predicting section 130 uses a learned CNN model, but the present embodiment is not limited to this. The masked region predicting section 130 may predict the image of the masked region using a learned model of another algorithm, or may predict the image of the masked region using an algorithm that is different from learning. The masked region predicting section 130 supplies the reproduced image generating section 140 with the plurality of predicted images predicted respectively for the plurality of masked regions.

At step 240, the reproduced image generating section 140 generates a reproduced image, using the plurality of predicted images predicted respectively for the plurality of masked regions. As an example, the reproduced image generating section 140 generates the reproduced image using the plurality of predicted images predicted respectively for different cells. At this time, the reproduced image generating section 140 may generate the reproduced image by arranging the plurality of predicted images predicted respectively for the plurality of cells at step 230 at the original positions of these cells, for example. The reproduced image generating section 140 supplies the difference detecting section 150 with the generated reproduced image.

At step 250, the difference detecting section 150 detects the difference between the target image and the reproduced image. As an example, the difference detecting section 150 makes a comparison between the target image supplied from the target image acquiring section 110 and the reproduced image supplied from the reproduced image generating section 140, in every predetermined region (e.g. every pixel, every pixel group, every cell used when masking the target image, and the like), and calculates the degree of difference in every predetermined region. At this time, the difference detecting section 150 may calculate the degree of difference based on the L2 norm, i.e. the Euclidian distance, between the target image and the reproduced image. Furthermore, the difference detecting section 150 may output a detection map in which the display attributes (e.g. color, concentration, and the like) in each predetermined region differ according to the degree of difference. The difference detecting section 150 then supplies the judging section 160 with the degree of difference in every predetermined region.

At step 260, the judging section 160 judges whether the degree of difference calculated at step 250 is less than or equal to a predetermined threshold value. If the degree of difference is less than or equal to the predetermined threshold value, i.e. if the degree of difference satisfies a predetermined quality standard, the judging section 160 proceeds to step 270, judges that the examination target is acceptable, and ends the process. On the other hand, if the degree of difference exceeds the predetermined threshold value, i.e. if the degree of difference does not satisfy the predetermined quality standard, the judging section 160 proceeds to step 280, judges that the examination target is unacceptable, and ends the process. At this time, the judging section 160 may judge the examination target to be unacceptable if the largest degree of difference, among the degrees of difference for every predetermined region, exceeds the predetermined threshold value, for example. The judging section 160 outputs the judgment result to another function section, another apparatus, and the like. The threshold value used for this judgment may be the minimum value, or a value slightly lower than this minimum value, obtained when the degree of difference is calculated by the examination apparatus 100 according to the present embodiment using an image obtained by capturing an examination target that is known to be unacceptable. Furthermore, in the above description, an example is shown in which the judging section 160 judges acceptability of the examination target based on the largest degree of difference among the degrees of differences of every predetermined region, but the present embodiment is not limited to this. The judging section 160 may judge acceptability of the examination target based on another statistical value of the degree of difference, e.g. the median value, average value, distribution, or the like.

Figure 3:
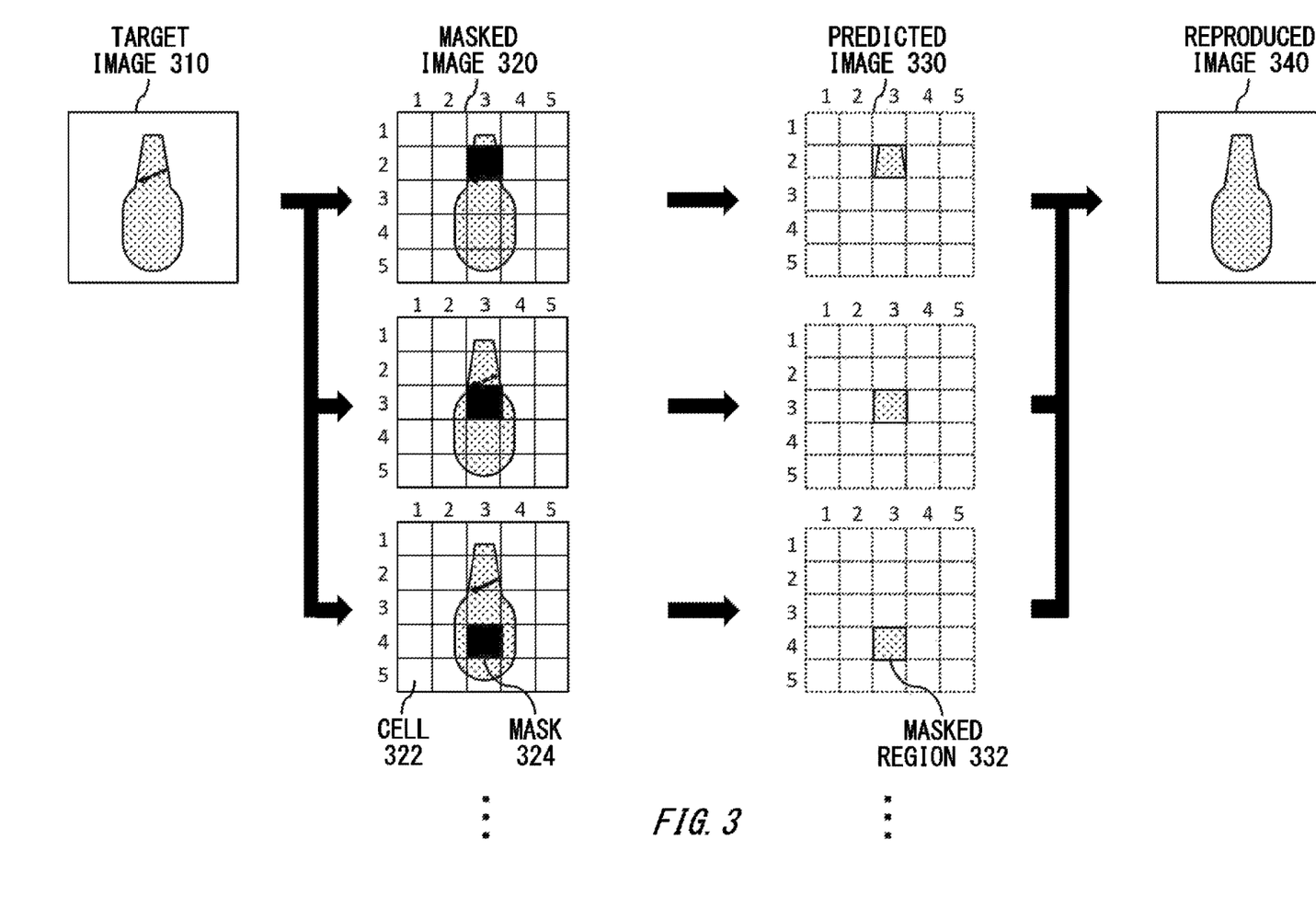
FIG. 3 shows an example of a target image 310, masked images 320, predicted images 330, and a reproduced image 340 in the examination using the examination apparatus 100 according to the present embodiment.

FIG. 3 shows an example of a target image 310, masked images 320, predicted images 330, and a reproduced image 340 in the examination using the examination apparatus 100 according to the present embodiment. The target image acquiring section 110 acquires the target image 310 such as shown in this drawing, as an example. The target image masking section 120 divides the target image 310 into a plurality of cells 322 (a total of 25 cells where [vertical, horizontal]=[1, 1] to [5, 5] in the present drawing). The target image masking section 120 sequentially masks each of these cells 322 using a mask 324, to generate each of the plurality of masked images 320. As an example, the top, middle, and bottom masked images 320 in the present drawing are respectively cases where the cell [2, 3], the cell [3, 3], and the cell [4, 3] are masked. The masked region predicting section 130 predicts the image of the masked region 332 for each of the plurality of cells 322, to generate each of the plurality of predicted images 330. The reproduced image generating section 140 generates the reproduced image 340 by arranging the plurality of predicted images 330 predicted for the plurality of cells 322 at the original positions of these cells 322.

Figure 4:
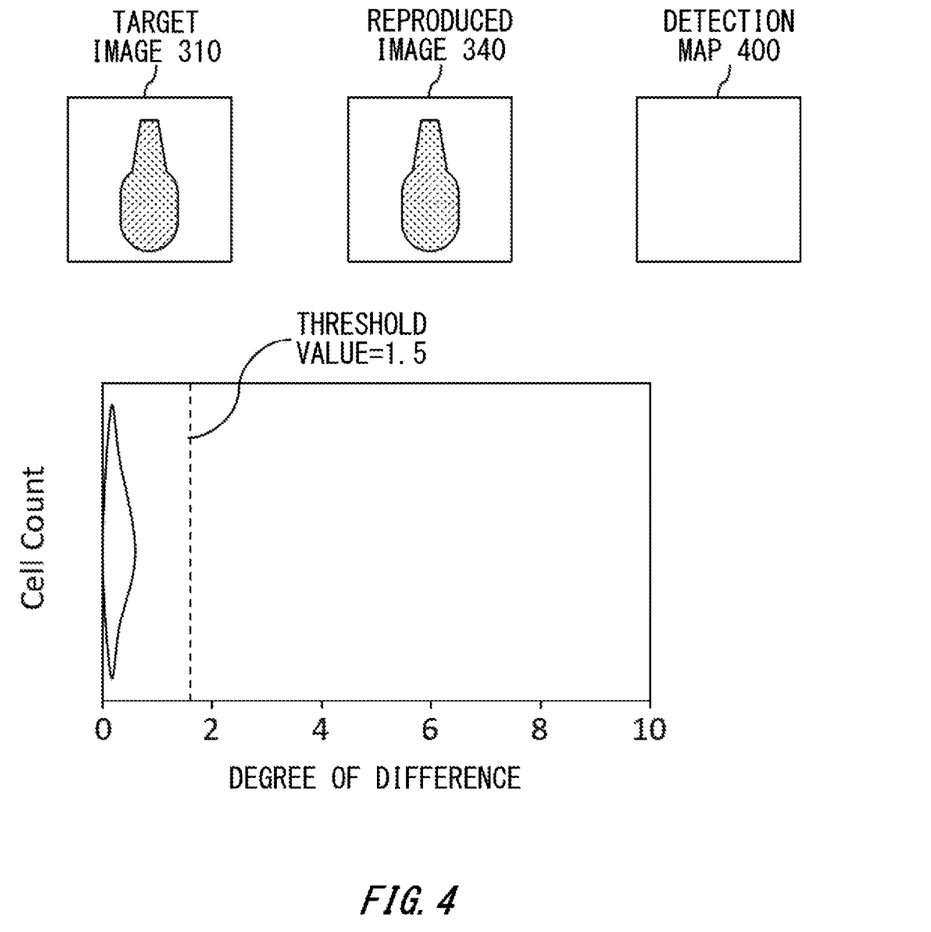
FIG. 4 shows an example of the examination result in a case where the examination target is acceptable, in the present embodiment.

FIG. 4 shows an example of the examination result in a case where the examination target is acceptable, in the present embodiment. If the examination target is acceptable, the reproduced image 340 generated by the examination apparatus 100 is approximately the same as the target image 310. This is because, since the examination apparatus 100 predicts the state that the masked region should be in if the examination target is acceptable using the learned model that has learned using only training images of examination targets that are known to be acceptable, the reproduced image 340 generated by the examination apparatus 100 is an image in which is reproduced the state that the examination target should be in if this examination target is acceptable. Accordingly, even in the detection map 400 in which the display attributes of every predetermined region differ according to the degree of difference, all of the regions have approximately the same display attributes. Furthermore, in a distribution (bottom portion of the present drawing) obtained by counting the number of unit regions (cell unit regions in the present drawing) of every degree of difference, the majority of cells are counted as having a degree of difference near 0, and none of the cells are counted at positions where the degree of difference is greater than 1.5 (the threshold value). Here, the unit regions may be regions such as pixel units, pixel group units, and cell units, and the present drawing shows an example in which the unit regions are cell unit regions. Furthermore, a greater width on the vertical axis indicates a greater number of counted cells. The examination apparatus 100 judges the examination target in the target image 310 to be acceptable if the difference between the target image 310 and the reproduced image 340 is small in this manner.

Figure 5:
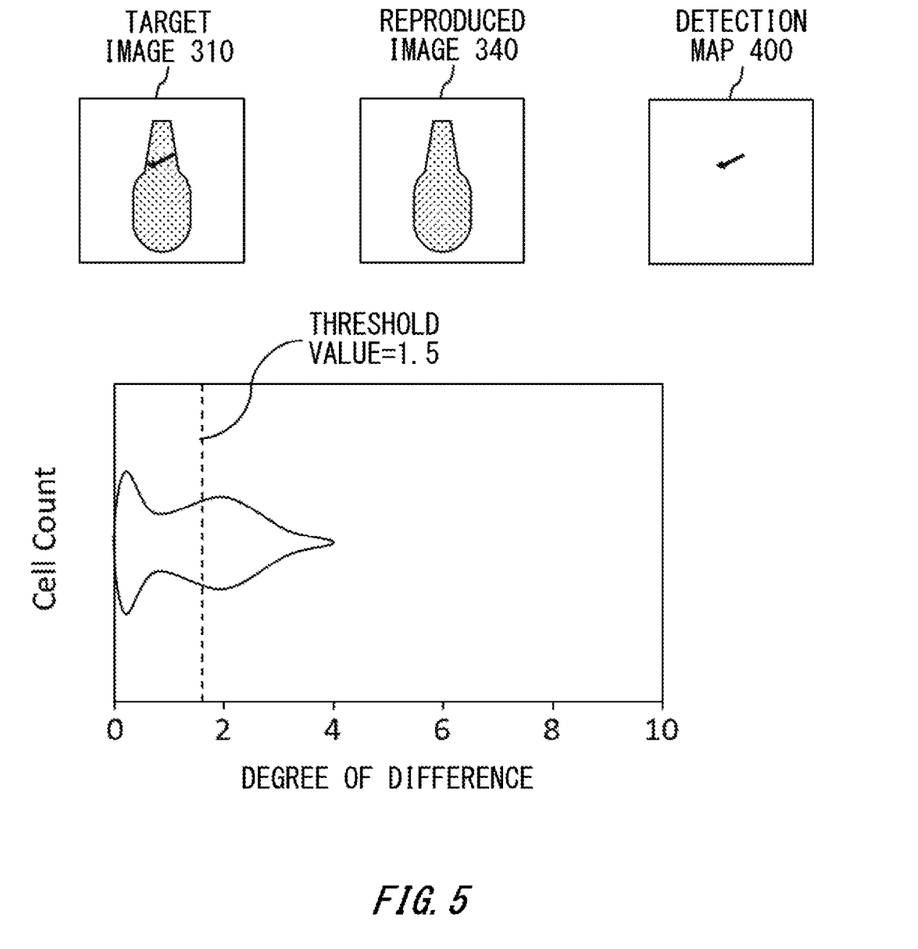
FIG. 5 shows an example of examination results in a case where the examination target is unacceptable.

FIG. 5 shows an example of examination results in a case where the examination target is unacceptable. If the examination target is unacceptable (e.g. if the examination target is cracked), the reproduced image 340 generated by the examination apparatus 100 is different from the target image 310. In this case, regions where the degree of difference differs are shown by differing attributes in the detection map 400. Furthermore, in the distribution of the degrees of difference, many cells are counted at positions where the degree of difference is large, and several cells are counted at positions where the degree of difference is greater than 1.5. When the difference between the target image 310 and the reproduced image 340 is large in this manner, the examination apparatus 100 judges the examination target in the target image 310 to be unacceptable.

In this way, according to the examination apparatus 100 of the present embodiment, it is possible to easily understand the state of the examination target by detecting the difference between an image (target image 310) obtained by capturing the actual state of the examination target and an image (reproduced image 340) obtained by predicting and reproducing the state that the examination target should be in if the examination target is acceptable. Furthermore, the examination apparatus 100 outputs the detection map 400 in which the display attributes differ in every region according to the degree of difference, and therefore it is possible to easily understand the location of defects in the examination target. Yet further, the examination apparatus 100 outputs the distribution obtained by counting the number of unit regions of every degree of difference, and therefore it is possible to understand the frequency with which regions having different degrees of difference occur in the image.

Such an examination using the examination apparatus 100 according to the present embodiment may be performed during manufacturing of the probe and before shipping of the probe, or may be performed immediately before or at intervals of the actual testing of a semiconductor device using the probe, for example. Furthermore, in a case where a visual inspection using images from a plurality of directions would be useful, the examination apparatus 100 may more deeply understand the state of the examination target by performing this examination using the images of the examination target captured from a plurality of directions.

The description above uses an example in which the examination apparatus 100 judges the acceptability of the examination target based only on an appearance examination using an image, but the present embodiment is not limited to this. The examination apparatus 100 may judge the acceptability of the examination target based on both an appearance examination using an image and the electrical characteristics.

As an example, if the judging section 160 judges that the examination target is unacceptable, the electrical characteristics of the examination target are predicted from the target image obtained by capturing an examination target that has been judged to be unacceptable, and if these electrical characteristics do not satisfy a predetermined quality standard, the examination target may be confirmed as being unacceptable. For example, the judging section 160 may use a learned model that has learned to be able to predict the electrical characteristics of the examination target when the target image obtained by capturing the examination target is input thereto. In other words, the judging section 160 may use a learned model that has learned to be capable of predicting the electrical characteristics, e.g. the resistance value and the like, of a probe pin when the target image obtained by capturing a probe pin is input thereto. Then, if the probe pin is judged to be unacceptable at step S280 of FIG. 2, the judging section 160 may input the target image obtained by capturing a probe pin judged to be unacceptable to this learned model to predict the resistance value of the probe pin, and if the resistance value does not satisfy a predetermined quality standard, may confirm that the probe pin that is the examination target is unacceptable. The description above shows an example in which the judging section 160 predicts the electrical characteristics of the examination target using a learned model, but the present embodiment is not limited to this. The judging section 160 may predict the electrical characteristics of the examination target from the target image using an algorithm different from learning.

Similarly, if the examination target is judged to be unacceptable, the judging section 160 may predict the electrical characteristics of the examination target from the target image obtained by capturing the examination target that has been judged to be unacceptable, and if the electrical characteristics fulfill the predetermined quality standard, may determine that the examination target is acceptable. For example, if the probe pin is judged to be unacceptable at step S280 of FIG. 2, the judging section 160 may input the target image obtained by capturing the probe pin judged to be unacceptable to the learned model to predict the resistance value of the probe pin, and if the resistance value satisfies a predetermined quality standard, may determine that the probe pin that is the examination target is acceptable.

In this way, the examination apparatus 100 can accurately judge the acceptability of the examination target by considering the electrical characteristics, in addition to the appearance examination using an image. For example, even if an examination target that has been judged to be unacceptable in the appearance examination using an image due to the effects of reflected shadows, particles, or the like during the image capturing of the examination target, there can be cases where there are no problems with the electrical characteristics. Therefore, the examination apparatus 100 can more accurately judge the acceptability of the examination target by combining this appearance examination with the electrical characteristics.

Figure 6:
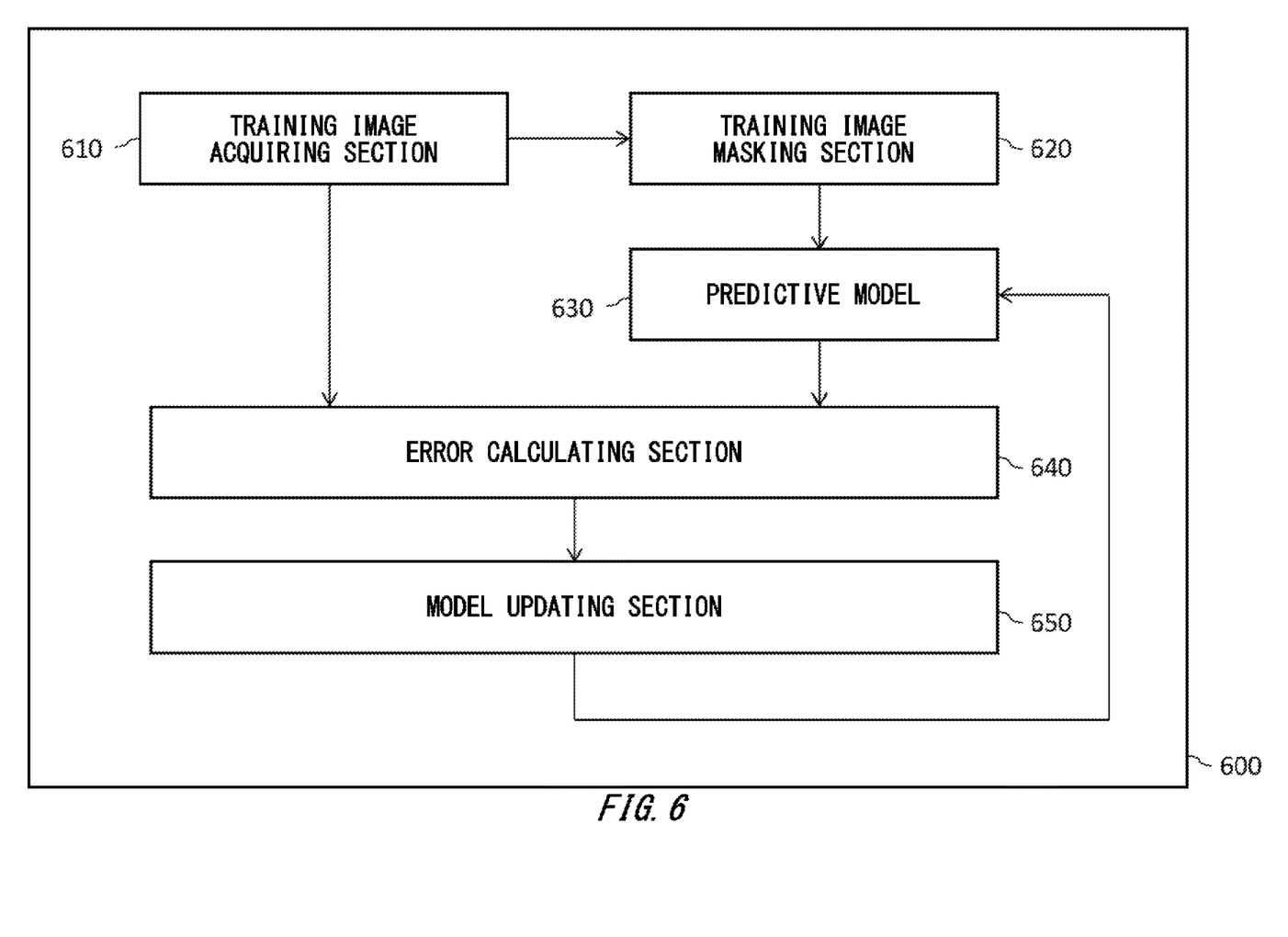
FIG. 6 shows an example of a block diagram of a learning apparatus 600 according to the present embodiment.

FIG. 6 shows an example of a block diagram of a learning apparatus 600 according to the present embodiment. The learning apparatus 600 causes a model to learn to be capable of predicting a masked region from an image of another region that is not masked, when an image in which a partial region is masked is input thereto, using only training images of targets that are known to be acceptable. In other words, the learning apparatus 600 causes a model to be able to predict the state that a partial region that is masked should be in if the examination target is acceptable, using only training images of targets known to be acceptable. The examination apparatus 100 according to the present embodiment may predict the masked region using a learned model that is caused to learn by the learning apparatus 600 such as shown in the present drawing, for example.

The learning apparatus 600 may be a computer such as a PC (personal computer), tablet computer, smartphone, work station, server computer, or general purpose computer, or may be a computer system in which a plurality of computers are connected. Such a computer system is also a computer, in a broad sense. The learning apparatus 600 may be implemented in a virtual computer environment that can be executed in one or more computers. Instead, the learning apparatus 600 may be a specialized computer designed for the purpose of model learning, or may be specialized hardware realized by specialized circuitry. If the learning apparatus 600 is capable of connecting to the Internet, the learning apparatus 600 may be realized by cloud computing.

The learning apparatus 600 includes a training image acquiring section 610, a training image masking section 620, a predictive model 630, an error calculating section 640, and a model updating section 650.

The training image acquiring section 610 acquires a training image. As an example, the training image acquiring section 610 may acquire a plurality of images in which examination targets known to be acceptable are captured, as training images. At this time, the training image acquiring section 610 may acquire the training images via a network, acquire the training images via user input, or acquire the training images via a memory device or the like capable of storing data, for example. The training image acquiring section 610 supplies the training image masking section 620 and the error calculating section 640 with the acquired training images.

The training image masking section 620 masks a portion of a training image. As an example, the training image masking section 620 supplies the predictive model 630 with a plurality of masked images obtained by randomly masking the plurality of images acquired as training images.

The predictive model 630 receives a training image in which a partial region is masked, and outputs a model image obtained by predicting the training image. As an example, when the training image in which the partial region is masked is input, the predictive model 630 predicts the state that the masked region should be in if the examination target is acceptable, and outputs the model image obtained by predicting this training image. At this time, the predictive model 630 may use an algorithm such as CNN, for example, to predict the masked region. The above description shows an example in which the predictive model 630 uses CNN, but the present embodiment is not limited to this. The predictive model 630 may predict the image of the masked region using an algorithm other than CNN. The predictive model 630 supplies the error calculating section with the output model image.

The error calculating section 640 calculates the error between the training image supplied from the training image acquiring section 610 and the model image supplied from the predictive model 630. The error calculating section 640 supplies the model updating section 650 with the calculated error.

The model updating section 650 updates the predictive model 630 based on the error between the training image supplied from the training image acquiring section 610 and the model image supplied from the predictive model 630. The following uses a flow to describe the details of the learning of a model using such a learning apparatus 600.

Figure 7:
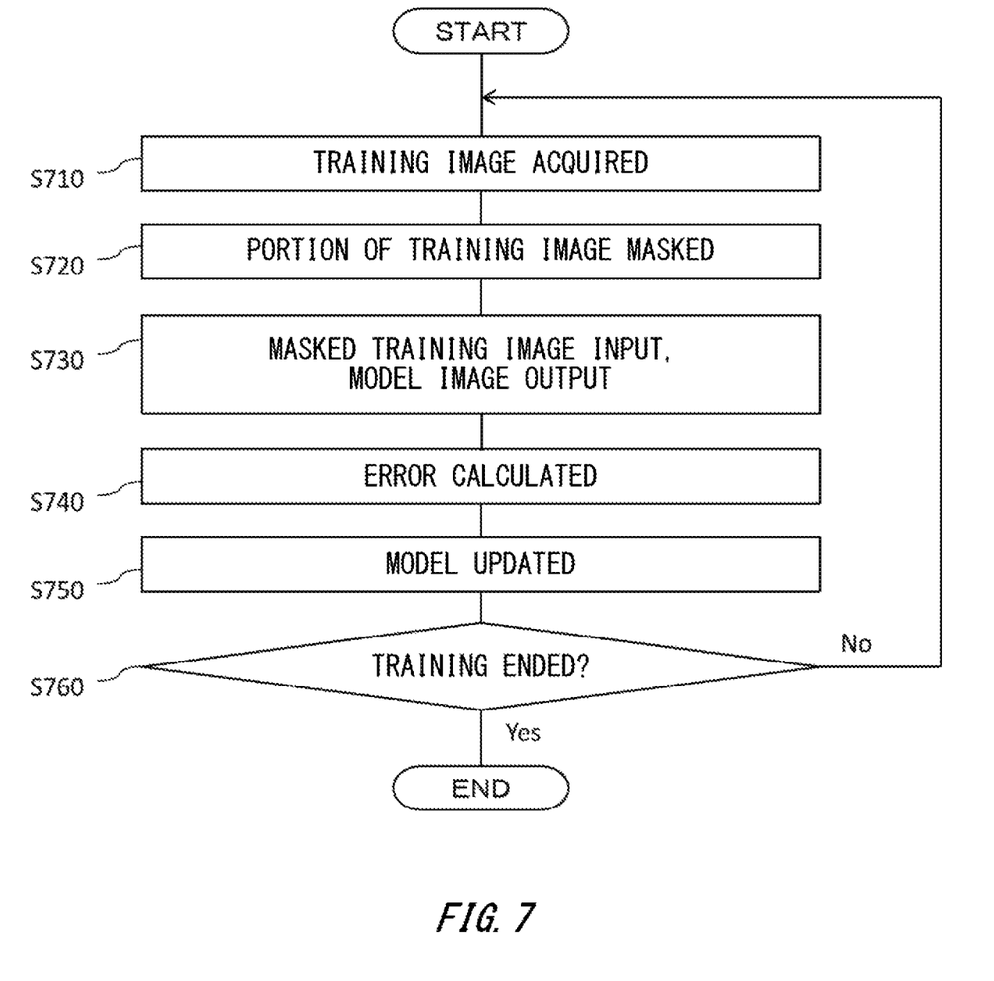
FIG. 7 shows an example of a flow of the learning of the predictive model 630 by the learning apparatus 600 according to the present embodiment.

FIG. 7 shows an example of a flow of the learning of the predictive model 630 by the learning apparatus 600 according to the present embodiment. At step 710, the training image acquiring section 610 acquires the training images. As an example, the training image acquiring section 610 acquires, via a network, a plurality of images in which examination targets known to be acceptable are captured. The training image acquiring section 610 acquires the images obtained by pre-processing the acquired images, as the training images, in the same manner as the target image acquiring section 110. At this time, the training image acquiring section 610 may drop images in which the focus is shifted from the examination target, using a contour detection filter or the like, without acquiring these images as training images. The training image acquiring section 610 supplies the training image masking section 620 and the error calculating section 640 with the acquired training images.

At step 720, the training image masking section 620 masks portions of the training images. For example, the training image masking section 620 randomly selects a plurality of images acquired as training images. Then, the training image masking section 620 randomly masks one cell, among a plurality of cells obtained by dividing the image region, in each of the randomly selected images. The training image masking section 620 then supplies the predictive model 630 with the plurality of masked images obtained by randomly masking the randomly selected images.

At step 730, the predictive model 630 receives the masked training images, and outputs a model image obtained by predicting the training images. For example, when the masked images in which partial regions are randomly masked are input, the predictive model 630 predicts the images of the masked regions from the images of other regions that are not masked. The predictive model 630 then outputs the model image by embedding the predicted images in the masked regions of the training images. The predictive model 630 supplies the error calculating section 640 with the model image.

At step 740, the error calculating section 640 calculates the error between the training image supplied from the training image acquiring section 610 and the model image supplied from the predictive model 630. The error calculating section 640 supplies the model updating section 650 with the calculated error.

At step 750, the model updating section 650 updates the predictive model 630 based on the error between the training image supplied from the training image acquiring section 610 and the model image supplied from the predictive model 630. For example, the model updating section 650 updates parameters such as weights in the predictive model 630 in a manner to minimize an objective function, which is the error calculated at step 740.

At step 760, the learning apparatus 600 judges whether the training has ended. At step 760, if it is judged that the training has not ended, the learning apparatus 600 returns the processing to step 710 and repeats these processes. On the other hand, if it is judged at step 760 that the training has ended, the learning apparatus 600 ends the processing. At this time, the learning apparatus 600 may judge whether the training has ended based on conditions such as the training time, number of trainings, and training accuracy, for example.

In this way, according to the learning apparatus 600 of the present embodiment, the predictive model 630 is updated in a manner to minimize the error between the training image and the model image, using only a plurality of images in which the captured examination targets are known to be acceptable as the training images, and therefore the learning apparatus 600 can update the predictive model 630 to be capable of predicting the image of a state that the masked region should be in if the examination target is acceptable.

Various embodiments of the present invention may be described with reference to flowcharts and block diagrams whose blocks may represent (1) steps of processes in which operations are performed or (2) sections of apparatuses responsible for performing operations. Certain steps and sections may be implemented by dedicated circuitry, programmable circuitry supplied with computer-readable instructions stored on computer-readable media, and/or processors supplied with computer-readable instructions stored on computer-readable media. Dedicated circuitry may include digital and/or analog hardware circuits and may include integrated circuits (IC) and/or discrete circuits. Programmable circuitry may include reconfigurable hardware circuits comprising logical AND, OR, XOR, NAND, NOR, and other logical operations, flip-flops, registers, memory elements, etc., such as field-programmable gate arrays (FPGA), programmable logic arrays (PLA), and the like.

The computer-readable medium may be a tangible device that can store instructions to be executed by a suitable device, and as a result, a computer-readable medium having instructions stored thereon is a product that includes instructions that can be executed in order to create the means for executing the operations designated by flow charts and block diagrams. Examples of the computer-readable medium may include an electronic storage device, a magnetic storage device, an optical storage device, an electromagnetic recording medium, a magnetic recording medium, an optical recording medium, an electromagnetic recording medium, a semiconductor recording medium, and the like. Specific examples of the computer-readable medium may include a floppy (Registered Trademark) disk, a diskette, a hard disk, a random access memory (RAM), a read-only memory (ROM), an erasable programmable read-only memory (EPROM or Flash memory), an electrically erasable programmable read-only memory (EEPROM), a static random access memory (SRAM), a portable compact disc read-only memory (CD-ROM), a digital versatile disk (DVD), a Blu-ray (Registered Trademark) disk, a memory stick, an integrated circuit card, or the like.

The computer-readable instructions may be assembler instructions, instruction-set-architecture (ISA) instructions, machine instructions, machine dependent instructions, microcode, firmware instructions, state-setting data, or either source code or object code written in any combination of one or more programming languages, including an object oriented programming language such as Smalltalk, JAVA (Registered Trademark), Javascript (Registered Trademark), C++ or the like, and conventional procedural programming languages, such as the "C" programming language or similar programming languages.

The computer-readable instructions may be provided to a processor or programmable circuitry of a general purpose computer, special purpose computer, or other programmable data processing apparatus to produce a machine, either locally, via a local area network (LAN), or via a wide area network (WAN) such as the Internet, and may be executed to create the means for performing the operations designated by the flow charts and block diagrams. Examples of the processor include a computer processor, a processing unit, a microprocessor, a digital signal processor, a controller, a microcontroller, and the like.

Figure 8:
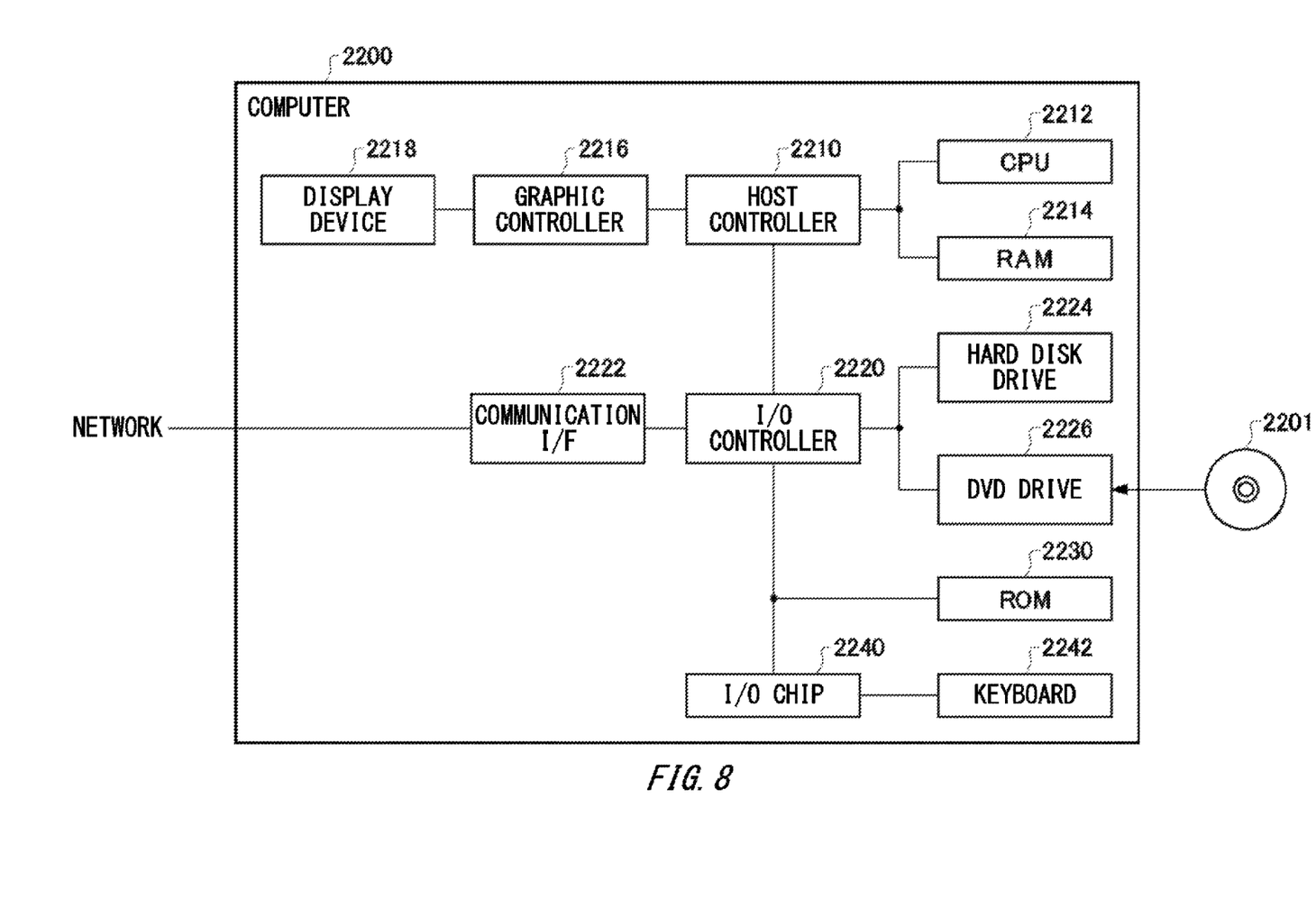
FIG. 8 shows an example of a computer 2200 in which aspects of the present invention may be wholly or partly embodied.

FIG. 8 shows an example of a computer 2200 in which aspects of the present invention may be wholly or partly embodied. A program that is installed in the computer 2200 can cause the computer 2200 to function as or perform operations associated with apparatuses of the embodiments of the present invention or one or more sections thereof, and/or cause the computer 2200 to perform processes of the embodiments of the present invention or steps thereof. Such a program may be executed by the CPU 2212 to cause the computer 2200 to perform certain operations associated with some or all of the blocks of flowcharts and block diagrams described herein.

The computer 2200 according to the present embodiment includes a CPU 2212, a RAM 2214, a graphic controller 2216, and a display device 2218, which are mutually connected by a host controller 2210. The computer 2200 also includes input/output units such as a communication interface 2222, a hard disk drive 2224, a DVD-ROM drive 2226 and an IC card drive, which are connected to the host controller 2210 via an input/output controller 2220. The computer also includes legacy input/output units such as a ROM 2230 and a keyboard 2242, which are connected to the input/output controller 2220 through an input/output chip 2240.

The CPU 2212 operates according to programs stored in the ROM 2230 and the RAM 2214, thereby controlling each unit. The graphic controller 2216 obtains image data generated by the CPU 2212 on a frame buffer or the like provided in the RAM 2214 or in itself, and causes the image data to be displayed on the display device 2218.

The communication interface 2222 communicates with other electronic devices via a network. The hard disk drive 2224 stores programs and data used by the CPU 2212 within the computer 2200. The DVD-ROM drive 2226 reads the programs or the data from the DVD-ROM 2201, and provides the hard disk drive 2224 with the programs or the data via the RAM 2214. The IC card drive reads programs and data from an IC card, and/or writes programs and data into the IC card.

The ROM 2230 stores therein a boot program or the like executed by the computer 2200 at the time of activation, and/or a program depending on the hardware of the computer 2200. The input/output chip 2240 may also connect various input/output units via a parallel port, a serial port, a keyboard port, a mouse port, and the like to the input/output controller 2220.

A program is provided by computer readable media such as the DVD-ROM 2201 or the IC card. The program is read from the computer readable media, installed into the hard disk drive 2224, RAM 2214, or ROM 2230, which are also examples of computer readable media, and executed by the CPU 2212. The information processing described in these programs is read into the computer 2200, resulting in cooperation between a program and the above-mentioned various types of hardware resources. An apparatus or method may be constituted by realizing the operation or processing of information in accordance with the usage of the computer 2200.

For example, when communication is performed between the computer 2200 and an external device, the CPU 2212 may execute a communication program loaded onto the RAM 2214 to instruct communication processing to the communication interface 2222, based on the processing described in the communication program. The communication interface 2222, under control of the CPU 2212, reads transmission data stored on a transmission buffering region provided in a recording medium such as the RAM 2214, the hard disk drive 2224, the DVD-ROM 2201, or the IC card, and transmits the read transmission data to a network or writes reception data received from a network to a reception buffering region or the like provided on the recording medium.

In addition, the CPU 2212 may cause all or a necessary portion of a file or a database to be read into the RAM 2214, the file or the database having been stored in an external recording medium such as the hard disk drive 2224, the DVD-ROM drive 2226 (DVD-ROM 2201), the IC card, etc., and perform various types of processing on the data on the RAM 2214. The CPU 2212 may then write back the processed data to the external recording medium.

Various types of information, such as various types of programs, data, tables, and databases, may be stored in the recording medium to undergo information processing. The CPU 2212 may perform various types of processing on the data read from the RAM 2214, which includes various types of operations, processing of information, condition judging, conditional branch, unconditional branch, search/replace of information, etc., as described throughout this disclosure and designated by an instruction sequence of programs, and writes the result back to the RAM 2214. In addition, the CPU 2212 may search for information in a file, a database, etc., in the recording medium. For example, when a plurality of entries, each having an attribute value of a first attribute associated with an attribute value of a second attribute, are stored in the recording medium, the CPU 2212 may search for an entry matching the condition whose attribute value of the first attribute is designated, from among the plurality of entries, and read the attribute value of the second attribute stored in the entry, thereby obtaining the attribute value of the second attribute associated with the first attribute satisfying the predetermined condition.

The above-explained program or software modules may be stored in the computer readable media on or near the computer 2200. In addition, a recording medium such as a hard disk or a RAM provided in a server system connected to a dedicated communication network or the Internet can be used as the computer readable media, thereby providing the program to the computer 2200 via the network.

While the embodiments of the present invention have been described, the technical scope of the invention is not limited to the above described embodiments. It will be apparent to persons skilled in the art that various alterations and improvements can be added to the above-described embodiments. It should also apparent from the scope of the claims that the embodiments added with such alterations or improvements are within the technical scope of the invention.

The operations, procedures, steps, and stages of each process performed by an apparatus, system, program, and method shown in the claims, embodiments, or diagrams can be performed in any order as long as the order is not indicated by "prior to," "before," or the like and as long as the output from a previous process is not used in a later process. Even if the process flow is described using phrases such as "first" or "next" in the claims, embodiments, or diagrams, it does not necessarily mean that the process must be performed in this order.

What is claimed is:

1. An examination apparatus comprising:
   a target image acquiring section that acquires a target image obtained by capturing an examination target image;
   a target image masking section that masks a portion of the target image, the target image masking section being configured to divide the target image into a plurality of cells, each cell corresponding to a predetermined region that is to be masked, the target image masking section being configured to generate a plurality of masked images by sequentially masking each of the plurality of cells to generate a corresponding one of the plurality of masked images, such that each one of the plurality of masked images corresponds to a respective one of the plurality of cells and each one of the plurality of masked images has a predetermined masked region defined by the respective one of the plurality of cells;

a masked region predicting section that predicts a predicted image of the masked region in each one of the plurality of masked images to generate a plurality of predicted images predicted respectively for the masked region in each of the plurality of masked images;

a reproduced image generating section that generates a reproduced image using the plurality of predicted images by placing each of the plurality of predicted images in the same position in the reproduced image as the position of a corresponding one of the plurality of cells in the target image; and a difference detecting section that detects a difference between the target image and the reproduced image.

2. The examination apparatus according to claim 1, wherein the difference detecting section compares the target image to the reproduced image in every predetermined region, to calculate a degree of the difference in every predetermined region.

3. The examination apparatus according to claim 2, further comprising: a judging section that judges the examination target to be unacceptable if the degree of difference does not satisfy a predetermined quality standard.

4. The examination apparatus according to claim 3, wherein the judging section judges the examination target to be unacceptable if a largest degree of difference, among the degrees of difference of every predetermined region, exceeds a predetermined threshold value.

5. The examination apparatus according to claim 3, wherein if the judging section judges the examination target to be unacceptable, the judging section predicts an electrical characteristic of the examination target from the target image obtained by capturing the examination target that was judged to be unacceptable, and confirms that the examination target is unacceptable if the electrical characteristic does not satisfy a predetermined quality standard.

6. The examination apparatus according to claim 3, wherein if the judging section judges the examination target to be unacceptable, the judging section predicts an electrical characteristic of the examination target from the target image obtained by capturing the examination target that was judged to be unacceptable, and determines that the examination target is acceptable if the electrical characteristic satisfies a predetermined quality standard.

7. The examination apparatus according to claim 2, wherein the difference detecting section outputs a detection map in which a display attribute differs in every predetermined region, according to the degree of difference.

8. The examination apparatus according to claim 2, wherein the difference detecting section calculates the degree of difference based on a Euclidian distance between the target image and the reproduced image.

9. The examination apparatus according to claim 1, wherein the target image acquiring section acquires an image obtained by performing a grayscale conversion on the captured image of the examination target, as the target image.

10. The examination apparatus according to claim 1, wherein the target image acquiring section acquires an image obtained by performing object detection on the examination target in the captured image of the examination target to narrow a target region, as the target image.

11. An examination method comprising:
acquiring a target image obtained by capturing an examination target image;
sequentially masking a plurality of predetermined regions of the target image to generate a plurality of masked images each having a masked region corresponding to a respective one of the plurality of predetermined regions;
predicting a predicted image of the masked region of each of the plurality of masked images to generated a plurality of predicted images;
generating a reproduced image using the plurality of predicted images by placing each of the plurality of predicted images in the same position in the reproduced image as the position of the respective one of the plurality of predetermined regions in the target image; and
detecting a difference between the target image and the reproduced image.

12. A non-transitory computer-readable medium storing thereon an examination program that, when executed by a computer, causes the computer to function as:
a target image acquiring section that acquires a target image obtained by capturing an examination target image;
a target image masking section that masks a portion of the target image, the target image masking section being configured to divide the target image into a plurality of cells, each cell corresponding to a predetermined region that is to be masked, the target image masking section being configured to generate a plurality of masked images by sequentially masking each of the plurality of cells to generate a corresponding one of the plurality of masked images, such that each one of the plurality of masked images corresponds to a respective one of the plurality of cells and each one of the plurality of masked images has a predetermined masked region defined by the respective one of the plurality of cells;
a masked region predicting section that predicts a predicted image of the masked region in each one of the plurality of masked images to generate a plurality of predicted images predicted respectively for the masked region in each of the plurality of masked images;
a reproduced image generating section that generates a reproduced image using the plurality of predicted images by placing each of the plurality of predicted images in the same position in the reproduced image as the position of a corresponding one of the plurality of cells in the target image; and
a difference detecting section that detects a difference between the target image and the reproduced image.

13. The examination apparatus according to claim 1, wherein the plurality of cells are of uniform size and shape.

14. The examination method according to claim 11, wherein the plurality of predetermined regions are of uniform size and shape.

15. The non-transitory computer-readable medium according to claim 12, wherein the plurality of cells are of uniform size and shape.

* * * * *